United States Patent [19]

Inukai et al.

[11] Patent Number: 5,128,389

[45] Date of Patent: * Jul. 7, 1992

[54] HARD COATING AGENTS COMPRISING FLUORINE-CONTAINING ACXYLATE COPOLYMERS

[75] Inventors: Hiroshi Inukai, Settsu; Takahiro Kitahara, Suita, both of Japan

[73] Assignee: Daikin Industries, Ltd., Osaka, Japan

[*] Notice: The portion of the term of this patent subsequent to Jan. 14, 2009 has been disclaimed.

[21] Appl. No.: 587,511

[22] Filed: Sep. 25, 1990

Related U.S. Application Data

[63] Continuation of Ser. No. 301,587, Jan. 26, 1989, abandoned.

[30] Foreign Application Priority Data

Feb. 1, 1988 [JP] Japan .................................. 63-21611

[51] Int. Cl.$^5$ .......................... C08F 30/08; C08F 2/50; C08F 18/20
[52] U.S. Cl. .................................. 522/172; 522/182; 526/245; 526/279
[58] Field of Search ................. 522/172; 526/245, 279

[56] References Cited

U.S. PATENT DOCUMENTS

| 4,478,990 | 10/1984 | Kohno et al. ........................ 526/279 |
| 4,511,209 | 4/1985 | Skutnik ............................... 522/172 |
| 4,743,106 | 5/1988 | Novicky .............................. 526/279 |
| 4,786,658 | 11/1988 | Hashimoto et al. ................. 522/121 |
| 5,021,501 | 6/1991 | Ohmori et al. ...................... 526/245 |
| 5,021,527 | 6/1991 | Ohmori et al. ...................... 526/245 |
| 5,032,641 | 7/1991 | Nanishi et al. ...................... 526/245 |

FOREIGN PATENT DOCUMENTS

| 2038418 | 2/1987 | Japan ................................. 526/245 |
| 2-169018 | 6/1990 | Japan ................................. 526/245 |

*Primary Examiner*—Marion E. McCamish
*Assistant Examiner*—Susan Berman
*Attorney, Agent, or Firm*—Larson and Taylor

[57] ABSTRACT

This invention provides: (1) a hard coating agent of low refractive index comprising an unsaturated double bond-containing ester compound having fluorine-containing organic group, an unsaturated double bond-containing compound having alkoxysilyl group and a photopolymerization initiator; and (2) a hard coating agent of low refractive index comprising a copolymer prepared by copolymerizing the unsaturated double bond-containing ester compound having fluorine-containing organic group and the unsaturated double bond-containing compound having alkoxysilyl group.

9 Claims, No Drawings

HARD COATING AGENTS COMPRISING FLUORINE-CONTAINING ACXYLATE COPOLYMERS

This application is a continuation of application Ser. No. 07/301,587 filed Jan. 26, 1989 now abandoned.

The present invention relates to coating compositions capable of giving a hard coat which is low in refractive index and high in hardness.

In recent years, attempts have been made to prevent diffused reflection of light beams on glass or plastics substrates by forming an anti-reflection coat of low refractive index thereon. For this purpose, the coating of fluorine-containing compounds has been proposed (see Japanese Unexamined Patent Publications Nos. 26944/1984 and 115840/1984). However, the disclosed coatings have the drawback of being readily marred due to its softness.

Nowadays on the other hand, it has been increasingly desired to improve the hardness of plastics substrate surface. To meet this demand, numerous coating compositions capable of forming hard coats have been proposed (see Japanese Unexamined Patent Publication No.76343/1977 and Japanese Examined Patent Publication No.472/1980). However, the coating of proposed coating compositions has high refractive index (1.42 at lowest), hence unable to prevent diffused reflection.

It is the main object of the present invention to provide coating compositions which produce coats having low refractive index and high hardness and which can be easily applied to substrates. The coating composition giving coats of high hardness will be hereinafter referred to as "hard coating agent".

Other objects and features of the invention will become apparent from the following description.

We conducted extensive research on coating materials capable of giving coats of low refractive index and high hardness and facilitating application, and found that the foregoing object can be achieved by a composition comprising an unsaturated double bond-containing ester compound having fluorine-containing organic group, an unsaturated double bond-containing compound having alkoxysilyl group and a photopolymerization initiator or a composition comprising a copolymer prepared by copolymerizing said compounds. The present invention has been accomplished on the basis of this novel finding.

This invention provides:

(1) a hard coating agent of low refractive index comprising an unsaturated double bond-containing ester compound having fluorine-containing organic group, an unsaturated double bond-containing compound having alkoxysilyl group and a photopolymerization initiator; and (2) a hard coating agent of low refractive index comprising a copolymer prepared by copolymerizing the unsaturated double bond-containing ester compound having fluorine-containing organic group and the unsaturated double bond-containing compound having alkoxysilyl group.

(A) Described below in detail is the hard coating agent (1) of low refractive index comprising the unsaturated double bond-containing ester compound having fluorine-containing organic group, the unsaturated double bond-containing compound having alkoxysilyl group and the photopolymerization initiator.

Preferred unsaturated double bond-containing ester compounds having fluorine-containing organic group include, for example, compounds represented by the formula

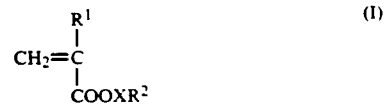

wherein $R^1$ is hydrogen atom, fluorine atom, chlorine atom or methyl group, X is $(CH_2)_p$ (wherein p is an integer of 1 to 3),

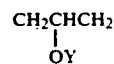

(wherein Y is hydrogen atom or

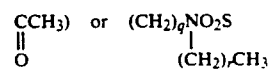

q is an integer of 1 to 4 and r is an integer of 0 to 3), and $R^2$ is fluorine-containing alkyl group, alkenyl group or ether group.

The group represented by $R^1$ in the compound of the formula (I) is preferably fluorine atom, chlorine atom or methyl group in view of hardness. Especially preferred $R^1$ group is fluorine atom from the viewpoints of low refractive index, high photo-setting rate and excellent adhesion as well as high hardness. Preferred examples of $R^2$ groups are perfluoroalkyl groups having 1 to 20 carbon atoms such as $(CF_2)_7CF_3$, $(CF_2)_7CF(CF_3)_2$ and the like, alkyl groups partially substituted with fluorine such as $CF_2CF_2H$, $(CF_2CF_2)_2H$, $C(CF_3)_2CH_3$ and the like, alkenyl groups substituted with fluorine such as

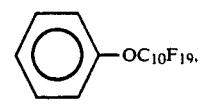

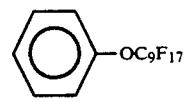

and the like, ether groups substituted with fluorine such as $C(CF_3)FOCF_2C(CF_3)FOC_3F_7$ and the like among which fluorine-containing alkyl groups having 1 to 20 carbon atoms are more preferred.

Specific examples of compounds of the formula (I) are $CH_2=CFCOOCH_2CF_3$, $CH_2=CFCOOCH_2C_2F_5$, $CH_2=CFCOOCH_2C(CF_3)_2CH_3$, $CH_2=CFCOOCH_2CH_2C_8F_{17}$, $CH_2=CFCOOCH_2C(CF_3)FOCF_2C(CF_3)FOC_3F_7$,

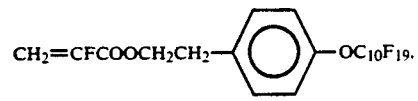

$CH_2=C(CH_3)COO(CH_2)_3N(CH_3)O_2SC_8F_{17}$,
$CH_2=C(CH_3)COOCH_2(CF_2CF_2)_5H$,
$CH_2=CFCOOCH_2CH_2(CF_2CF_2)_3C(CF_3)_2F$,
$CH_2=CClCOOC(CF_3)_3$, $CH_2=CFCOOCH_2C(CF_3)_3$,
$CH_2=CFCOOCH_2C(CF_3)_2H$, $CH_2=CFCOOCH_2$-
$CH(OH)CH_2C_8F_{17}$, etc.

Preferred examples of the unsaturated double bond-containing compound having alkoxysilyl group are compounds represented by the formula

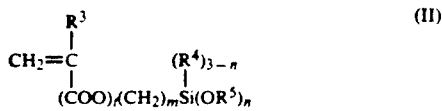

wherein $R^3$ is hydrogen atom, fluorine atom, chlorine atom or methyl group, $R^4$ is alkyl group, fluorine-containing alkyl group or cycloalkyl group, $R^5$ is alkyl group having 1 to 4 carbon atoms, t is 0 or 1, m is an integer of 0 to 4, and n is an integer of 1 to 3.

The compounds of the formula (II) which are preferred in view of hardness, refractive index and strength are those wherein $R^3$ is fluorine atom or methyl group, $R^5$ is alkyl group having 1 to 3 carbon atoms, t is 1, m is an integer of 1 to 4 and n is an integer of 1 to 3.

Specific examples of the compounds of the formula (II) are $CH_2=CHSi(OCH_3)_3$, $CH_2=CHSi(OC_2H_5)_3$, $CH_2=CHSi(OCH_3)_2CH_3$, $CH_2=C(CH_3)COO(CH_2)_3Si(OCH_3)_3$, $CH_2=CFCOO(CH_2)_3Si(OCH_3)_2CH_2CH_2CF_3$, $CH_2=CFCOO(CH_2)_3Si(OCH_3)_3$, $CH_2=CHCOOCH_2Si(OCH_3)_3$, $CH_2=CClCOOCH_2CH_2Si(OC_2H_5)_2CH_3$,

etc.

There is no specific limitation on the proportions of the unsaturated double bond-containing ester compound having fluorine-containing organic group and the unsaturated double bond-containing compound having alkoxysilyl group to be used for the hard coating agent of the present invention. Usually the amount of the unsaturated double bond-containing ester compound having fluorine-containing organic group is suitably selected from the range of about 30 to about 95% by weight and the amount of the unsaturated double bond-containing compound having alkoxysilyl group from the range of about 70 to about 5% by weight. A preferable amount of the unsaturated double bond-containing compound having alkoxysilyl group is about 10% by weight or more from the viewpoint of hardness but is 50% by weight or less from the viewpoint of refractive index.

Photopolymerization initiators useful in the invention include, for example, known ones such as benzoinalkyl ether, α-hydroxyisobutylphenone, 1-hydroxycyclohexylphenyl ketone, etc. The amount of the photopolymerization initiator to be used in the invention is not specifically limited and is usually in the range of about 0.5 to about 10% by weight, preferably about 1 to about 5% by weight, based on the combined amount of the unsaturated double bond-containing ester compound having fluorine-containing organic group and the unsaturated double bond-containing compound having alkoxysilyl group.

The hard coating agent (1) of the present invention may contain styrene, methyl methacrylate, polyfunctional acrylate, methacrylic acid, glycidyl methacrylate or the like as well as the unsaturated double bond-containing ester compound having fluorine-containing organic group and the unsaturated double bond-containing compound having alkoxysilyl group. The hard coating agent (1) of the invention may further contain a silane compound free of double bond such as $Si(OCH_3)_4$, $Si(OC_2H_5)_4$, $CH_3Si(OCH_3)_3$, $NH_2CH_2CH_2Si(OCH_3)_3$, $SHCH_2CH_2CH_2Si(OCH_3)_3$, $CF_3CH_2CH_2Si(OCH_3)_3$, silica sol or the like, polyvinyl alcohol or the like. The amount of these compounds to be added is about 30% by weight or less based on the combined amount of the unsaturated double bond-containing ester compound having fluorine-containing organic group and the unsaturated double bond-containing compound having alkoxysilyl group.

The hard coating agent (1) of the invention is used by the following method. The hard coating agent (1) is applied to the surface of a substrate, and the coated substrate is irradiated with ultraviolet light, whereby the unsaturated double bond-containing compounds in the agent are polymerized to provide a coating layer of low reflectivity on the substrate. Useful light sources are a high-pressure mercury lamp, metal halide lamp, etc. Substrates for use in application of the hard coating agent of the invention are not specifically limited and include those of plastics such as polymethyl methacrylate, polycarbonate, polystyrene, polyester or the like, glass or like materials.

The hard coating agent (1) of the invention can be applied to a substrate by known coating methods employable for uniform coating such as dipping, roll coating, spin coating, spray coating, flow coating, bar coating or like coating methods. Before application, an accelerator for crosslinking of silyl group such as hydrochloric acid, acetic acid, dibutyltin dilaurate or the like may be added to the hard coating agent (1) of the invention.

A primer may be used to improve the adhesion of coat to the substrate. Useful primers are silane-type, acryl-type, urethane-type, melamine-type, epoxy-type, polyester-type or like primers which are heretofore known. Included among useful silane-type primers is, for example, a condensate of silane coupling agent as disclosed in Japanese Examined Patent Publication No.32423/1973. Primers having a refractive index equal to or higher than that of the substrate are preferred to achieve more effective prevention of reflection.

It is desirable to fully crosslink the coating layer on application by its exposure to the moisture in the air or by its standing in an air-conditioned container (wet curing) in order to enhance the hardness of layer. A preferred crosslinking time in this case is about 30 minutes to about 24 hours.

A desired thickness of the coating layer (layer of low reflectivity) thus formed is about 0.01 to about 30 μm. A thinner layer is given lower hardness, whereas a thicker layer increases the costs.

B. Described below is the hard coating agent (2) of low refractive index comprising a copolymer prepared by copolymerizing the unsaturated double bond-containing ester compound having fluorine-containing organic group and the unsaturated double bond-containing compound having alkoxysilyl group.

The copolymer used in the hard coating agent (2) can be prepared from any combination of said two compounds exemplified hereinbefore as useful unsaturated double bond-containing ester compound having fluorine-containing organic group and useful unsaturated double bond-containing compound having alkoxysilyl group. A class of the compounds of the formula (I) wherein $R^1$ is fluorine atom is preferred in view of refractive index and adhesion and also because of the ability to accelerate the polymerization rate and facilitate the increase of molecular weight, namely enhance the productivity.

Preferred polymerization methods are mass or bulk polymerization, solution polymerization and like methods among which the solution polymerization method is preferred. Solvents useful for the solution polymerization include, for example, acetone, methyl isobutyl ketone, ethyl acetate, butyl acetate, toluene, xylene, 1,1,2-trichlorotrifluoroethane, metaxylenehexafluoride, 1,1,1-trichloroethane and the like. Useful polymerization initiators include known compounds such as azobisisobutyronitrile, benzoyl peroxide and the like. A preferred polymerization temperature is in the range of about 15° to about 100° C. It is desirable that the thus obtained polymer have a molecular weight of about 10000 or more in view of the strength of lowreflectivity layer. More preferable molecular weight is about 50000 to about 5000000.

Preferred copolymers in the invention include, for example, those comprising about 30 to about 95% by weight of a structural unit represented by the formula

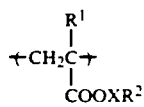

wherein $R^1$ is hydrogen atom, fluorine atom, chlorine atom or methyl group, X is $(CH_2)_p$ (wherein p is an integer of 1 to 3),

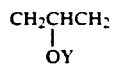

(wherein Y is hydrogen atom or

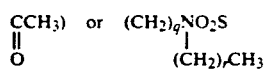

(q is an integer of 1 to 4, and r is an integer of 0 to 3), and $R^2$ is fluorine atom or fluorine-containing alkyl group, alkenyl group or ether group; and about 70 to about 5% by weight of a structural unit represented by the formula

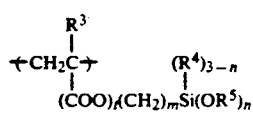

wherein $R^3$ is hydrogen atom, fluorine atom, chlorine atom or methyl group, $R^4$ is alkyl group, fluorine-containing alkyl group or cycloalkyl group, $R^5$ is alkyl group having 1 to 4 carbon atoms, t is 0 or 1, m is an integer of 0 to 4 and n is an integer of 1 to 3.

The obtained copolymer is diluted to a concentration of about 0.1 to about 20% by weight with a solvent to provide a hard coating agent (2) of low refractive index according to the present invention. The solvent useful for dilution is not specifically limited insofar as it is capable of dissolving the copolymer and does not corrode the substrate. Preferred examples of the solvent are ketone-type solvents such as acetone, methyl isobutyl ketone and the like; ester acetate-type solvents such as methyl acetate, ethyl acetate and the like; aromatic solvents such as toluene, xylene and the like; fluorine-type solvents such as 1,1,2-trichloro-1,2,2-trifluoroethane, metaxylenehexafluoride and the like; chlorine-type solvents such as 1,1,1-trichloroethane and the like; etc.

The hard coating agent (2) is used as follows. The hard coating agent is applied to a substrate and the solvent is evaporated off. When the coated substrate is heated for the evaporation at a temperature lower than the softening temperature of the substrate, the evaporation and crosslinking can be effectively accelerated. The heating time ranges from about 30 minutes to about 24 hours. Also in this case, wet curing can be effected at room temperature or at an elevated temperature. The wet curing time is in the range of about 30 minutes and about one week. Irradiation can effectively accelerate the curing.

The hard coating agents of the present invention exhibit a low refractive index of about 1.41 or less when cured, hence effective in preventing reflection of light beams. The agent has a pencil hardness of 3H or higher (as measured according to JIS K 5400), i.e. high hardness. Further the agent can be easily applied.

The hard coating agent of the invention is given water- and oil-repellency and antifouling property due to the presence of fluorine atom and silyl group.

The hard coating agents of the present invention find wide applications in coating the automotive windshields, panels of office equipment, glass sheets of show windows and the like.

EXAMPLES

The present invention will be described below in greater detail with reference to the following Examples, Comparison Examples and Test Examples wherein the parts are all by weight.

EXAMPLE 1

A 500 ml-glass flask was charged with 80 parts of hexafluoroneopentyl α-fluoroacrylate and 20 parts of trimethoxysilylpropyl α-fluoroacrylate both purified by distillation under reduced pressure, 0.04 part of n-dodecylmercaptan, 0.5 part of 2,2'-azoisobutyronitrile as a polymerization initiator, 233 parts of ethyl acetate and 5 parts of isopropanol. These components were fully mixed and dissolved. Then deaeration and nitrogen replacement were repeated and the flask was hermetically closed.

Subsequently the mixture was polymerized for 18 hours in a reactor maintained at a temperature of 50° C. After completion of polymerization, 20 g of the thus obtained polymer solution was poured into methanol. The precipitated polymer was separated from the liquid and vacuum-dried at a temperature of 20° C. for 20 hours, giving 5.93 g of a polymer (polymerization ratio 96%). The molecular weight of the polymer was determined by gas permeation chromatography (model 150c, manufactured by Waters Co., Ltd.) and the polymer was found to have a molecular weight of 200,000, calculated as polystyrene.

The polymer was cured and tested on an Abbe refractometer (Atago Co., Ltd.) and the refractive index of the crosslinked product was found to be 1.398 in $n_D^{25}$ To 313 parts of the remaining polymer solution was added acetic acid in an amount of 10 ppm relative to the polymer and the mixture was diluted with 1565 parts of an ethyl acetate/butyl acetate/isopropanol mixture in a ratio by weight of 10:9:1, giving a composition as a hard coating agent which has a concentration of 5% by weight.

EXAMPLES 2 TO 5

Coating compositions as hard coating agents were prepared in the same manner as in Example 1 under the conditions listed below in Table 1.

thermohygrostat to 85° C. and 85% RH to complete crosslinking. The coating film had a thickness of 5 μm.

The coating films were tested for properties by the following methods.

(A) Reflectance

The coating films were tested for reflectance by UV spectrum (model U 3200 manufactured by Hitachi Ltd.) with use of a device for measuring regular reflection (5°) and were found to have an average reflectance of 400 to 700 nm.

(B) Scratch Resistance

The coating films were subjected to 20 strokes of scratch under a load of 200 g with a piece of steel wool fabric attached to a rubbing tester (product of Taihei Rika Kogyo K.K.) to check the susceptibility to dam-

TABLE 1

| Example | Unsaturated double bond-containing ester compound having fluorine-containing organic group | Unsaturated double bond-containing compound having alkoxysilyl group | Solvent for polymerization |
|---|---|---|---|
| 2 | $CH_2=CFCOOCH_2C(CF_3)_2CH_3$ (90 parts) | $CH_2=CHSi(OCH_3)_3$ (10 parts) | Ethyl acetate |
| 3 | $CH_2=C(CH_3)COOCH_2CH_2C_8F_{17}$ (80 parts) | $CH_2=C(CH_3)COOCH_2CH_2CH_2—Si(OCH_3)_3$ (20 parts) | Metaxylene-hexafluoride |
| 4 | $CH_2=CFCOOCH_2CH_2C_8F_{17}$ (70 parts) | $CH_2=CFCOOCH_2CH_2CH_2Si(OCH_3)_3$ (30 parts) | Metaxylene-hexafluoride |
| 5 | $CH_2=CFCOOCH_2C(CF_3)_2CH_3$ (75 parts) | $CH_2=CFCOOCH_2CH_2CH_2Si(OCH_3)_3$ (25 parts) | Ethyl acetate |

| Example | $n_D^{25}$ | Molecular weight | Solvent for dilution (wt ratio) | Crosslinking accelerator | Concentration (%) |
|---|---|---|---|---|---|
| 2 | 1.383 | 50000 | Ethyl acetate/n-butyl acetate (1:1) | Hydrochloric acid | 1 |
| 3 | 1.392 | 100000 | Trichlorotrifluoroethane | Trifluoroacetic acid | 5 |
| 4 | 1.386 | 200000 | Trichlorotrifluoroethane | None | 2 |
| 5 | 1.405 | 100000 | Ethyl acetate/butyl acetate/isopropanol (2:2:1) | None | 5 |

EXAMPLE 6

A 80 part-quantity of hexafluoroneopentyl α-fluoroacrylate and 20 parts of trimethoxysilylpropyl α-fluoroacrylate both purified by distillation under reduced pressure were vigorously mixed, and the mixture was mixed with Darocure 1116 (trademark, product of Merck & Co., Inc.) serving as a photopolymerization initiator, giving a composition as a hard coating agent.

EXAMPLE 7

A 70-part quantity of heptadecafluorodecyl α-fluoroacrylate and 30 parts of trimethoxysilylpropyl α-fluoroacrylate were thoroughly mixed and the mixture was mixed with 3 parts of Irugacure 184 (trademark, product of Ciba-Geigy, Ltd.), giving a composition as a hard coating agent.

TEST EXAMPLE 1

The hard coating agents of the invention prepared in Examples 1 to 5 were each applied by a doctor blade of 250 μm thickness to both surfaces of a 2 mm-thick panel of polymethyl methacrylate (PMMA panel) or panel of diethylene glycol bisallycarbonate (CR-39 panel) which was washed before use. The coated panel was dried at 90° C. for 1 hour to prepare a test panel. The test panel was laid for 10 hours in a container adjusted with a age. The result was evaluated by the following three-grade ratings.
A: No scratching
B: Slightly scratched
C: Numerous scratches and blushing found

(C) Pencil Hardness

According to JIS K 5400

(D) Adhesion

A peel test using cellophane adhesive tapes was conducted on a square-cut test panel according to JIS K 5400.

(E) Transmittance of Visible Light

Measured by UV spectrum and visible spectrum at a wavelength of 400 to 700 nm (model U3200 manufactured by Hitachi Ltd.).

Table 2 below shows the results.

TEST EXAMPLES 2 TO 5

The same tests as in Test Example 1 were conducted with the results shown below in Table 2.

TEST EXAMPLES 6 AND 7

The hard coating agents of this invention prepared in Examples 6 and 7 were each applied to both surfaces of a washed, 2-mm thick polycarbonate panel (PC panel) with a doctor blade of 12.5 μm thickness. The coated panels thus obtained were exposed to UV radiation supplied by a conveyor-type UV irradiation device (model ASE-2000 manufactured by Japan Storage Battery Co., Ltd.) using a conveyor running at a speed of 5 m/min, whereby the coating layer was cured on the front surface of test panel. The same procedure was repeated for curing the layer on the rear side of panel. In this way, test panels were prepared.

The properties of coating films on the test panels were evaluated by the same methods as in Test Example 1. Table 2 shows below the results.

COMPARISON EXAMPLES 1 TO 3

Untreated panels were used for comparative tests. Table 2 below shows the results.

COMPARISON EXAMPLE 4

A 10 part-quantity of $C_8F_{17}CH_2CH_2Si(OCH_3)_3$ and 0.01 part of acetic acid were mixed together to undergo 24 hours of reaction. The reaction mixture was applied to a PMMA panel to a thickness of 3 μm. The coated panel was laid for 24 hours in a container adjusted with a thermohygrostat to 85° C. and 85% RH to complete crosslinking, giving a test pan=1. In this way, test panels were prepared and the properties of coating films were evaluated by the same methods as in Test Example 1 with the results shown below in Table 2.

COMPARISON EXAMPLE 5

The same procedure in Comparison Example 4 was repeated to produce test panels with the exception of using a PC panel in place of the PMMA panel. The properties of coating films were evaluated by the same methods as in Test Example 1. Table 2 blow shows the results.

COMPARISON EXAMPLE 6

A 50-part quantity of tetrahydrofurfuryl acrylate and 2 parts of Irgacura 184 were vigorously mixed with 50 parts of oligoacrylate prepared by reacting 0.5 mole of tetrahydrophthalic anhydride, 1 mole of trimethylpropane and 2 moles of acrylic acid. Test panels were prepared in the same manner as in Test Example 6 and the properties of coating films were evaluated by the same methods as in Test Example 1. Table 2 below shows the results.

TABLE 2

| | Hard coating agent | Substrate | Film thickness (μm) | Reflectivity | Scratch resistance | Pencil hardness | Adhesion | Transmittance (%) |
|---|---|---|---|---|---|---|---|---|
| Test Example No. | | | | | | | | |
| 1 | Agent of Ex. 1 | PMMA | 5 | <2.0% | A | 6H | 100/100 | 85 |
| 2 | Agent of Ex. 2 | CR-39 | 0.5 | <2.0% | A | 4H | 100/100 | 80 |
| 3 | Agent of Ex. 3 | PMMA | 4 | <2.5% | A | 3H | 100/100 | 85 |
| 4 | Agent of Ex. 4 | PMMA | 2 | <2.5% | A | 5H | 100/100 | 85 |
| 5 | Agent of Ex. 5 | CR-39 | 5 | <2.5% | A | 7H | 100/100 | 80 |
| 6 | Agent of Ex. 6 | PC | 3 | <2.0% | A | 3H | 100/100 | 81 |
| 7 | Agent of Ex. 7 | PC | 5 | <2.0% | A | 3H | 100/100 | 80 |
| Comp. Example No. | | | | | | | | |
| 1 | None | PMMA | — | >3.0% | C | 3H | — | 88 |
| 2 | None | CR-39 | — | >4.0% | A | 3H | — | 83 |
| 3 | None | PC | — | >4.0% | C | 2B | — | 84 |
| 4 | Agent of Comp. Ex. 4 | PMMA | 3 | <3.5% | C | HB | 80/100 | 80 |
| 5 | Agent of Comp. Ex. 4 | PC | 3 | <3.5% | C | 2B | 95/100 | 78 |
| 6 | Agent of Comp. Ex. 6 | PC | 3 | >4.0% | A | 3H | 50/100 | 69 |

REFERENCE TEST EXAMPLE

The test panel obtained in Test Example 5 was used and the contact angle was determined. The contact angle was 118° in use of water, and 75° in use of n-hexadecane. The critical surface tension was 10.1.

The water repellency of coating film was determined according to JIS P8137 and was found to exhibit a maximum value $R_{10}$ (at which the water droplet is completely dropped), namely a high water repellency.

We claim:

1. A curable composition for producing a hard coating of low refractive index consisting essentially of
   (a) about 30 to about 95% by weight of an unsaturated double bond-containing ester compound represented by the formula

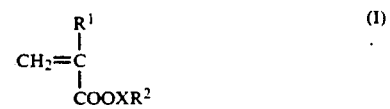
(I)

wherein $R^1$ is a fluorine atom, X is $(CH_2)_p$ (wherein p is an integer of 1 to 3),

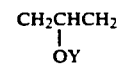

(wherein Y is hydrogen atom or

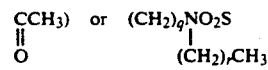

(q is an integer of 1 to 4 and r is an

(III)

wherein $R^1$ is fluorine atom, X is $(CH_2)_p$ (wherein p is an integer of 1 to 3), $$CH_2CHCH_2$$
$$|$$
$$OY$$

(wherein Y is hydrogen atom or $$\begin{matrix} CCH_3) & \text{or} & (CH_2)_qNO_2S \\ \| & & | \\ O & & (CH_2)_rCH_3 \end{matrix}$$

(q is an integer of 1 to 4 and r is an integer of 0 to 3), and $R^2$ is fluorine-containing alkyl group, alkenyl group or ether group, and (b) about 70 to about 5% by weight of a compound represented by the formula $$\begin{matrix} & R^3 & & & (IV) \\ & | & & \\ +CH_2-C\!+ & & (R^4)_{3-n} \\ & | & & | \\ & (COO)_t(CH_2)_mSi(OR^5)_n & \end{matrix}$$

wherein $R^3$ is hydrogen atom, fluorine atom, chlorine atom or methyl group, $R^4$ is alkyl group, fluorine-containing alkyl group or cycloalkyl group, $R^5$ is alkyl group having 1 to 4 carbon atoms, t is 0 or 1, m is an integer of 0 t 4, and n is an integer of 1 to 3.

2. The hard coating agent according to claim 1 which contains about 50 to about 90% by weight of the (a) compound and about 50 to about 10% by weight of the (b) compound, based on the combined amount of the (a) compound and the (b) compound.

3. The hard coating agent according to claim 1 which contains about 0.5 to about 10% by weight of the (c) photopolymerization initiator, based on the combined amount of the (a) compound and the (b) compound.

4. The hard coating agent according to claim 1 which contains about 1 to about 5% by weight of the (c) photopolymerization initiator, based on the combined amount of the (a) compound and the (b) compound.

5. The hard coating agent according to claim 1 wherein $R^2$ in the compound of the formula (I) is fluorine-containing alkyl group having 1 to 20 carbon atoms.

6. The hard coating agent according to claim 1 wherein $R^3$ in the compound of the formula (II) is fluorine atom or methyl group, $R^5$ is alkyl group having 1 to 3 carbon atoms, t is 1 m is an integer of 1 to 4 and n is an integer of 1 to 3.

7. A hard coating agent of low refractive index comprising a copolymer prepared by copolymerizing an unsaturated double bond-containing ester compound having fluorine-containing organic group and an unsaturated double bond-containing compound having alkoxysilyl group, the copolymer consisting essentially of (a) about 30 to about 95% by weight of a structural unit represented by the formula $$\begin{matrix} & R^1 & (III) \\ & | & \\ CH_2C & & \\ & | & \\ & COOXR^2 & \end{matrix}$$

wherein $R^1$ is a fluorine atom, X is $(CH_2)_p$ (wherein p is an integer of 1 to 3), $$CH_2CHCH_2$$
$$|$$
$$OY$$

(wherein Y is hydrogen atom or $$\begin{matrix} CCH_3) & \text{or} & (CH_2)_qNO_2S \\ \| & & | \\ O & & (CH_2)_rCH_3 \end{matrix}$$

(q is an integer of 1 to 4 and r is an integer of 0 to 3), and $R^2$ is fluorine-containing alkyl group, alkenyl group or ether group, and (b) about 70 to about 5% by weight of a compound represented by the formula $$\begin{matrix} & R^3 & & & (IV) \\ & | & & \\ +CH_2-C\!+ & & (R^4)_{3-n} \\ & | & & | \\ & (COO)_t(CH_2)_mSi(OR^5)_n & \end{matrix}$$

wherein $R^3$ is hydrogen atom, fluorine atom, chlorine atom or methyl group, $R^4$ is alkyl group, fluorine-containing alkyl group or cycloalkyl group, $R^5$ is alkyl group having 1 to 4 carbon atoms, t is 0 or 1, m is an integer of 0 to 4, and n is an integer of 1 to 3.

8. The hard coating agent according to claim 7 wherein the copolymer has a number average molecular weight of about 10000 or more.

9. The hard coating agent according to claim 8 wherein the copolymer has a number average molecular weight of about 50000 to about 5000000.

* * * * *